Sept. 26, 1967      L. P. HAUSAM      3,343,478
AUTOMATIC COFFEE MAKER
Filed June 23, 1966      3 Sheets-Sheet 1
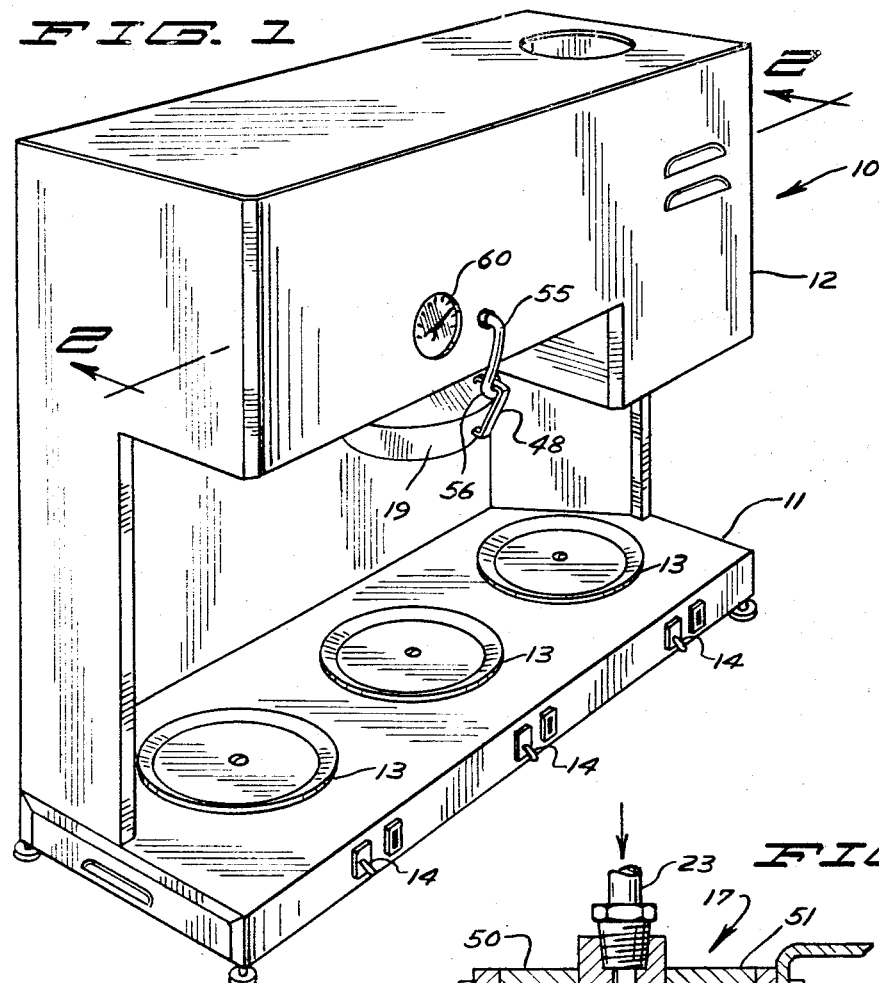
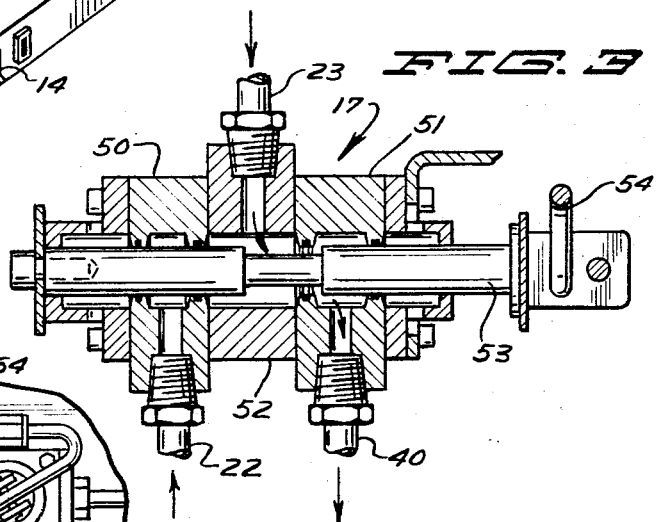
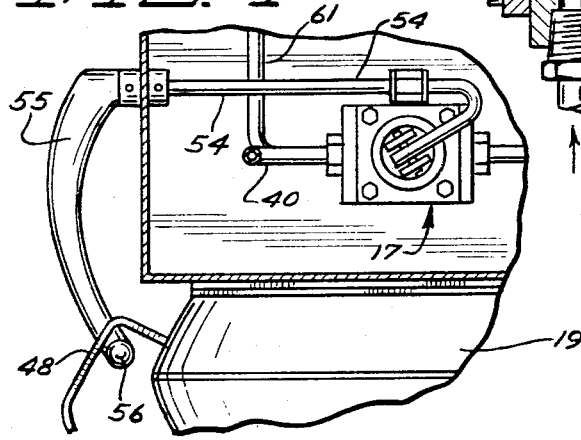
INVENTOR.
LEONARD P. HAUSAM
BY
Adams & Cuayna
ATTORNEYS

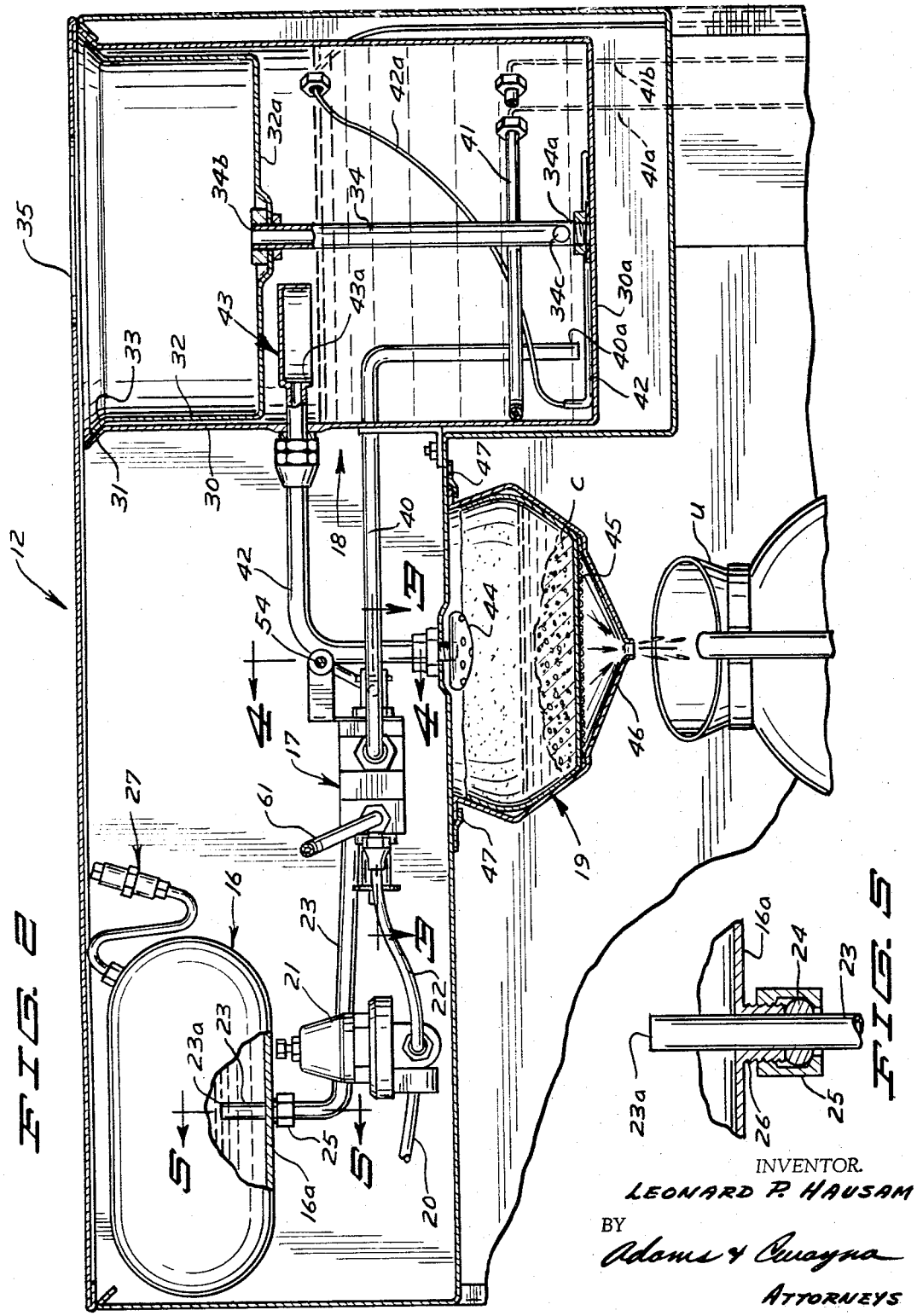

Sept. 26, 1967  L. P. HAUSAM  3,343,478
AUTOMATIC COFFEE MAKER
Filed June 23, 1966  3 Sheets-Sheet 3
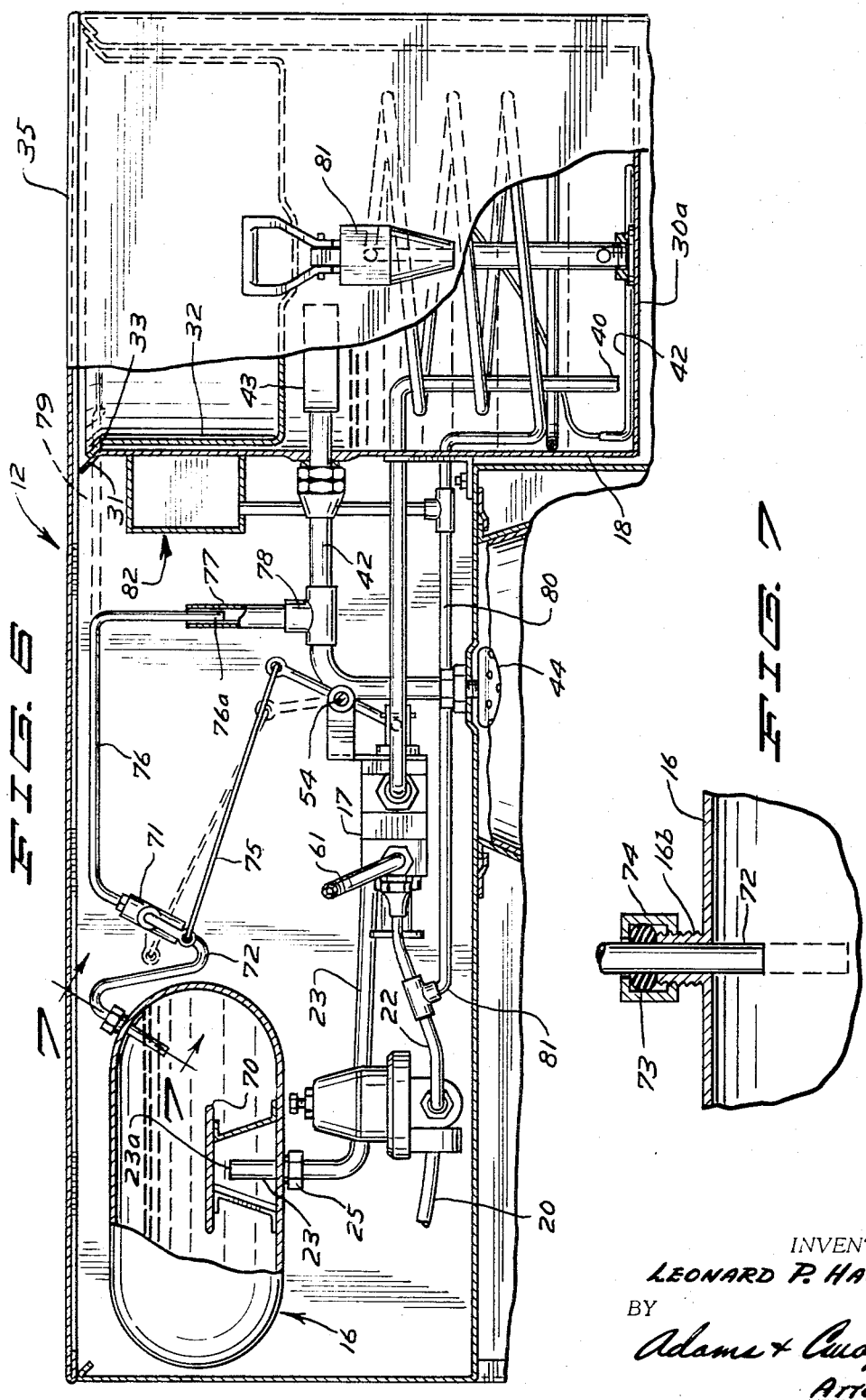
INVENTOR.
LEONARD P. HAUSAM
BY
Adams & Cuoyna
ATTORNEYS

United States Patent Office 3,343,478
Patented Sept. 26, 1967

3,343,478
AUTOMATIC COFFEE MAKER
Leonard P. Hausam, Minneapolis, Minn., assignor to Charter Design and Manufacturing Corporation, Minneapolis, Minn., a corporation of Minnesota
Filed June 23, 1966, Ser. No. 563,017
8 Claims. (Cl. 99—283)

This application is a continuation-in-part of an application filed Dec. 1, 1965, Ser. No. 510,797.

This invention relates generally to improvements in coffee making apparatus and more particularly to certain features which will permit completely automatic operation of a coffee maker for brewing any predetermined amount of coffee.

In the past various automatic coffee making devices have been commercially available and many of these have attained a high degree of success. There are, however, many problems with the automatic coffee makers now on the market and applicant has, through the invention of this coffee making unit eliminated practically all of these problems.

As is well known, most coffee makers operate on either a time cycle arrangement or a pressure responsive arrangement either of which arrangements includes a certain number of complicated control elements which must be incorporated into the device for proper operation.

In the coffee maker, as provided herein, applicant provides a uniquely simple unit which includes all of the normally available and necessary functions and elements of an automatic coffee maker; such functions and elements including a premeasuring system, a heating system and a water dispersion system for introducing the water to the coffee grounds whereby liquid coffee is produced.

Applicant provides herein a unit which is extremely mechanically simple but which effectively performs all of the necessary functions for the automatic brewing of coffee and wherein the coffee maker may be utilized as a constant source of brewed coffee with a minimum of attendant servicing.

With the device as provided herein it is possible to brew any predetermined amount of coffee through simply a variation of sizing of certain of the individual elements and although this unit is directed to an automatic coffee making sequence it may likewise be utilized as a manual coffee maker and in such case it will operate much as the coffee maker shown, described and claimed in my co-pending application filed July 22, 1964, Ser. No. 384,426, now abandoned, entitled Coffee Maker.

It is therefore an object of applicant's invention to provide a coffee maker which may be utilized as either a fully automatic coffee brewing device or as a manual coffee brewing device.

It is a further object of application's invention to provide an automatic coffee maker which will automatically brew a predetermined amount of liquid coffee and which will automatically prepare itself for continuous brewing of such predetermined amounts of coffee.

It is a further object of applicant's invention to provide an automatic coffee maker which is mechanically simple and also inexpensive which incorporates all of the necessary elements and functions for the automatic brewing of heated liquid coffee.

It is a further object of applicant's invention to provide an automatic coffee maker wherein the amount of liquid coffee brewed in any one specific cycle may be predetermined and set through a particularly unique and simple liquid measuring device.

It is a further object of this invention to provide positive siphon starting means to assist in the delivery of water to a coffee brewing section.

It is a further object of this invention to provide means for delivering at least limited amounts of heated water for use without the coffee maker without requiring any additional heating mechanism.

These and other objects of this invention will more fully appear from the following description made in connection with the accompanying drawings, wherin like reference characters refer to the same or similar parts throughout the several views and in which:

FIG. 1 is front perspective view showing the exterior surfaces of coffee maker embodying the principles of applicant's invention;

FIG. 2 is a vertical section taken substantially along line 2—2 of FIG. 1 particularly illustrating the flow system of the unit;

FIG. 3 is a horizontal section taken substantally along line 3—3 of FIG. 2 particularly illustraing the control and valving section of the unit;

FIG. 4 is a vertical section taken substantially along line 4—4 of FIG. 2 particularly illustrating the control handle and coffee basket retaining portion of the unit;

FIG. 5 is a vertical section taken substantially along line 5—5 of FIG. 2;

FIG. 6 is a vertical section similar to FIG. 2 illustrating certain improvements in the unit; and FIG. 7 is a section taken substantially along line 7—7 of FIG. 6.

In accordance with the accompanying drawings and as best illustrated in FIG. 1 a coffee maker embodying the concepts of this invention is generally designated 10. This unit 10 as it would be manufactured and used in a restaurant or the like would generally include a base portion 11 with an upper brewing portion 12 in upward, vertically spaced relation to base portion 11. The base portion 11 may include a plurality of plate heaters 13 with a plurality of control switches and indicator lights 14 thereon for the users convenience in maintaining the temperature of previously brewed coffee.

The base unit 11 is well known in the trade and it is obvious that the number of such component heaters 13 of the base 11 could be increased with manufacturing requests.

The upper brewing or percolator section 12 is illustrated in cross section in FIG. 2 and this view particularly illustrates the elements necessary for the automatic brewing of coffee including a premeasuring or water storage tank 16, a control valve 17, a heating reservoir 18 and a ground coffee confiining basket unit designated 19. In the brewing of coffee in an automatic system the amount of ground coffee placed into the confining basket 19 and the amount of water to be delivered thereto must be arranged in definite proportions to provide a liquid coffee of consistent strength and taste. Generally the idea of an automatic system includes premeasuring a selected amount of water, heating this water and delivering the now heated water to be sprayed or disbursed over a predetermined amount of ground coffee where the coffee will be brewed and after brewing will be delivered for consumer usage.

In the form shown a water inlet line 20 is provided for connection to a standardly available cold water tap and in the form shown this water is introduced into the the system through a regulator 21. The purpose of the regulator 21 is to prevent undue pressure surges from entering the brewing system and may be regarded as a safety element for operation of this unit. After regulation the inlet water is delivered through a conduit 22 into a main control valve 17 which is particularly illustrated in FIG. 3. The operation of this valve 17 will be described further hereinafter but it should suffice at this point to say that valve 17 is a 2 position valve which will permit connection from the inlet line 20 to the tank 16 in a first position and in a second position permits connection from premeasuring tank 16 to heating reservoir 18.

To afford flow of water from and to tank 16 a conduit 23 is provided to enter upwardly through the bottom surface 16a of tank 16 and it should be noted that conduit 23 is mounted in surface 16a in a particular manner as is particularly illustrated in FIG. 5. As shown in FIG. 5, conduit 23 is removably secured within a compressible gasket 24, which gasket 24 is connected to tank 16 through a nut member 25 provided for threaded engagement with boss 26 arranged on surface 16a on tank 16.

The compressibility of gasket 24 is important to ordinarily provide a sealed connection through conduit 23 and tank 16 and is likewise provided to permit shifting of the innermost end 23a of conduit 23 with respect to the bottom surface 16a of tank 16 whereby the amount of water evacuated from tank 16 at any one time may be controlled by shifting end 23a of conduit 23 upwardly or downwardly within tank 16.

Tank 16 is also provided with, as illustrated in FIG. 2, a float valve 27 which permits the passage of air therethrough such that tank 16 may receive or discharge water. Valve 27 is commonly known in the trade as a floating seal valve which seal will rise into closed position when the tank 16 is filled with water thus closing further flow of water into the system.

Reservoir 18 initially consists of a first outer container 30 having a substantially frusto-conical open top 31 which top is designed to receive and support a second inner tank 32 having a mating frusto-conical open portion 23 to rest on top 31 of container 30. This tank 32 is of substantially shorter longitudinal dimension than container 30 as illustrated in FIG. 2 and a flow tube 34 is provided connected at one end 32a to the bottommost surface 30a of container 30 and at the other end 34b to the bottommost surface 32a of tank 32. This tube 34 is provided with a passage 34c at its lower end 34a to permit flow of water from tank 32 into the bottommost portion of container 30. To introduce water into tank 32 an opening 35 may be provided through a cover portion of brewing section 12.

The inner tank 32 arrangement is directed primarily to the non-automatic operation of which this unit is capable and does not necessarily come into play during the automatic functions of the unit.

Water is directed from premeasuring, storage tank 16 through valve 17 via conduit 23 into heating reservoir 18 through conduit 40 which enters through a side of container 30 and discharges water through its open end 40a adjacent the bottom surface 30a of container 30 which entrance of water will force any water previously in container 30 upwardly.

To complete the construction of heating reservoir 18 it should be noted that a heating coil 41 is arranged with electrical leads 41a–41b thereon which leads are connected to a temperature control unit (not shown). A temperature sensing element 42 is likewise provided in reservoir 30 adjacent to the bottom surface 30a therefore where it will be in proper position to sense the temperature of water entering the tank 18 through conduit 40 and this sensing unit 42 is connected by conductor 42a to control the heating coil 41.

Heated water is delivered from heating reservoir 18 by providing a connecting conduit 42 from a siphoning cup 43 arranged in reservoir 18 which cup 43 consists of a generally inverted closed end tubular member. Conduit 42 communicates with siphon cup 43 through a side surface of cup 43. This heated water then is delivered through a spray head 44 into a coffee confining basket 19.

The coffee confining basket 19 is generally known in the trade and includes a support portion 45 for support of a filter or the like upon which coffee grounds may be placed. A frusto-conical discharge aperture is provided at the lower portion of basket 19 for discharge of the brewed coffee into the coffee service urn. Basket 19 is usually removably arranged in a pair of flange members 47 to permit the same to be removed from the unit when one batch of coffee has been brewed. To facilitate removal of basket 19 a handle member 48 is provided on the basket 19.

In the form shown and as illustrated in FIG. 3 valve 17 includes an inlet portion 50 an outlet portion 51 and a combined inlet-outlet portion 52.

A control member 53 is provided to control communication between the valve portions and in the position illustrated the flow of the water from inlet conduit 22 is closed but flow between premeasuring tools 16 and reservoir 18 is permitted through conduits 23, 40. These valves are commonly known in the art as spool valves and no further information is felt to be necessary.

An actuating member 54 to control the position of spool 53 is rotatably mounted on one end of spool 53 and extends outward through the cabinet portion of unit to a controlling handle 55. This control handle has, in the form showing a depending portion 56 such that in one position this downward depending portion 56 will engage with handle 48 of basket 19 and prevent removal of basket 19.

In order to sense and to inform the operator of the operative condition of the unit a dial indicator 60 is provided on the unit and this dial indicator 60 is responsive to inlet water entering the unit and more particularly water entering tank 16. A flow conduit 61 is provided from inlet conduit 22 to said dial 60. The mode of operation with regard to the dial 60 is that as water is flowing into the tank 16 no pressure and thus no dial reading will be indicated but when water fills tank 16 closing valve 27 pressure will be transmitted to dial 60 and the dial reading will indicate the fullness of the premeasuring tank 16.

During this filling operation work the handle 55 will be out of engaging position with handle 48 of basket 19 and therefore the replacement of fresh grounds into the basket 19 may be accomplished at this time. When it is desired to brew coffee, basket 19 is replaced and an urn U placed thereunder, handle 55 is then switched to a position, as shown in FIG. 3 in which water will flow from premeasuring tank 16 to heater reservoir 18. During this flow the handles 55 and 48 will be captively engaged and the dial indicator 60 will remain under pressure.

As water flows into heating reservoir 18 warm water previously contained thereon will be forced into the siphoning cup 43 and such flow will continue until the level of water drops below siphon cup 43. This siphon cup is designed as a positive siphon stop and is more specifically discussed in my prior application hereinbefore mentioned.

As stated the amount of water to be taken from premeasured tank 16 may be controlled by shifting conduit 23 within tank 16 and therefore it is not necessary to particularly correlate the size of premeasuring tank 16 and heating reservoir 18 but it is only necessary to correlate the volume of water above conduit 23 with the volume of the turn U being used.

In the improved apparatus illustrated in FIG. 6 the basic structure of the coffee maker is identical to the structure heretofore discussed with change and modification incorporated therein which produce certain advantages over the original unit.

In the form shown the structure is identified with numerals identical to those used in FIG. 2 with new numerals used only to identify the certain new elements.

A baffle plate structure 70 is provided in generally overlying relationship to the open end 23a of conduit 23 within tank 16 to prevent water entering tank 16 from splashing upwardly into the valve member at the upper end of the tank 16. In this particular form a manually operated valve 71 communicates with the uppermost portion of tank 16 through conduit 72 which conduit is adjustably arranged for controlled insertion into tank 16 by providing a conduit connecting structure similar to that adapted for use for conduit 23.

As illustrated in FIG. 7 a gasket member 73 is provided about conduit 72 and conduit 72 is held within tank 16 by a capturing nut member 74 arranged threadably engaged on outwardly threaded member 16b on tank 16. Tightening nut 74 will compress gasket 73 about conduit 72 and hold the same securely in tank 16. The position of conduit 72 within tank 16 may be controlled by loosening nut 74 and sliding the conduit 72 either inwardly or outwardly. This positioning ability affords the user an opportunity to adjust the amount of liquid which will be delivered into the tank 16 and therefore will control the amount of water delivered to tank 18 for brewing. With the conduit 72 inserted into tank 16 an air pressure head may be created to assist in delivering water therefrom.

Manual valve 71 is basically a two position valve which is controlled by a linkage 75 inner-connected to a handle actuated member 54. The position of valve 71 is maintained such that upon filling of tank 16 the valve is in closed position and upon brewing with water being delivered from tank 16 valve 71 is switched to open position.

A water drain conduit 76 is provided to communicate with valve 71 and in one form a free end 76a of conduit 76 is arranged within one leg 77 of an upstanding T-member 78 placed into connecting conduit 42. It should be noted that air is free to enter into conduit 76 by providing the connection between end 76a and leg 77 in unsealed condition. This air communication to tank 16 along with the pressure head within the tank 16 provides rapid flow from tank 16 to insure rapid starting of the siphon action from reservoir 18. End 76a of conduit 76 is arranged as shown such that any water within conduit 76 will drain into a normal water flow thus eliminating any unsightly water drip problems.

As also illustrated in the dotted line portion of FIG. 6 conduit 76 may as an alternative position deliver drainage water through end 79 disposed in overlying relationship to tank 32 again providing a proper receptacle for drainage water.

Still another improvement illustrated in FIG. 6 is the inclusion of an inlet conduit 80 communicating with a T-portion 71 in inlet line 22 of the unit. This conduit 80 passes into the reservoir 18 and coils therearound to deliver heated water through an outlet spigot 81 mounted on an exterior surface of the unit. It should be obvious that water carried through conduit 80 would be heated in the coiled section within reservoir 18 for any desired use. A pressure head system generally designated 82 and extending upwardly from conduit 80 and communicating therewith may be provided to assist delivery of heated water from spigot 81 in a lamina flow condition.

The advantages in this improved form would be obvious to anyone skilled in the art. Through these improvements a particularly simple method for controlling the amount of coffee to be brewed is provided simply by shifting the position of conduit 72 in tank 16. Likewise, shifting this conduit 72 permits the development of an air head which would assist in forcing the water from tank 16 and thereby assist in rapid starting of the siphon through conduit 42. A further advantage is the positive collection of drainage water from tank 16.

It should be obvious that applicant has provided a new and simple coffee maker which includes the necessary elements and functions of automatic coffee brewing apparatus with a minimum of operative parts.

It will, of course, be understood that various changes may be made without departing from the scope of my invention, which is generally stated in the manner set forth in the appended claims.

What I claim is:
1. An automatic coffee maker including:
   (a) coffee confining basket for holding a predetermined amount of ground coffee therein;
   (b) a reservoir unit for storing a predetermined amount of water;
   (c) means for heating the water in said reservoir;
   (d) a hot water supply conduit receiving and siphoning water from an uppermost portion of said reservoir and delivering the same into said coffee confing basket;
   (e) a second water storage tank arranged to receive water from an external source of supply;
   (f) means for delivering a predetermined amount of water from said second tank to said reservoir unit; and,
   (g) selective control means controlling the flow of water from the source to said second tank in one position and from said second tank to said reservoir in a second position.

2. The structure set forth in claim 1 and sensing means arranged in cooperation with said second storage tank responsive to the amount of water delivered thereto whereby the operative condition of the coffee maker may be determined.

3. The structure set forth in claim 1 wherein said selective control means includes a control handle member having a portion thereof arranged for interferring contact with said coffee confining basket in one position to prevent removal thereof but permitting removal of said basket when said control is in a second position.

4. The structure set forth in claim 1 wherein said means for delivering a predetermined amount of water include an adjustably insertable conduit received into said second tank to permit shifting of the conduit within the tank whereby the level of water remaining in the tank after delivery may be controlled.

5. The structure set forth in claim 1 wherein the means for delivering a predetermined amount of water to said reservoir unit includes a conduit having its discharge end in closely spaced relation to the lower most portion of said reservoir whereby heated water within the reservoir will be forced upwardly upon the introduction of additional water to the reservoir.

6. The structure set forth in claim 1 wherein said selective control means includes a two position valve member having an inlet and a pair of outlets wherein one position communication is afforded between the inlet and one of said outlets and in a second position comunication is afforded between the outlets.

7. The structure set forth in claim 1 and regulator means arranged to receive water from the source before introduction of the water into said second storage tank to control and limit surges of the water flowing into the coffee maker.

8. The structure set forth in claim 1 wherein the coffee confining basket is arranged below the normal level in said reservoir and said hot water supply conduit arranged to receive water from said reservoir is provided with siphon breaking means substantially larger in diameter than said conduit to provide a positive break in the siphoning action when the water level within the reservoir drops below said siphon breaking means.

References Cited

UNITED STATES PATENTS

| | | | |
|---|---|---|---|
| 2,881,692 | 4/1959 | Volcov | 99—283 |
| 3,034,417 | 5/1962 | Bunn | 99—307 |
| 3,220,334 | 11/1965 | Martin | 99—282 |
| 3,261,279 | 7/1966 | Kaplan et al. | 99—307 |

WALTER A. SCHEEL, *Primary Examiner.*

R. W. JENKINS, *Assistant Examiner.*